United States Patent [19]
Beveridge et al.

[11] Patent Number: 4,901,525
[45] Date of Patent: Feb. 20, 1990

[54] BOOSTER-SUSTAINER ROCKET ENGINE AND METHOD

[75] Inventors: John H. Beveridge; William H. Knuth, both of Huntsville, Ala.

[73] Assignee: Acurex Corporation, Mountain View, Calif.

[21] Appl. No.: 165,765

[22] Filed: Mar. 9, 1988

[51] Int. Cl.$^4$ .............................................. F02K 9/00
[52] U.S. Cl. ........................................ 60/211; 60/212; 60/217; 60/258; 102/350
[58] Field of Search ................ 60/211, 212, 217, 258, 60/260; 102/347, 350

[56] References Cited

U.S. PATENT DOCUMENTS

| | | | |
|---|---|---|---|
| 3,811,820 | 5/1974 | Wharton et al. | 60/217 X |
| 4,621,492 | 11/1986 | von Pragenau | 60/258 |
| 4,744,300 | 5/1988 | Bugiel | 60/213 X |
| 4,771,599 | 9/1988 | Brown et al. | 60/258 |
| 4,777,794 | 10/1988 | Nielsen | 60/211 |

*Primary Examiner*—Peter A. Nelson
*Attorney, Agent, or Firm*—Flehr, Hohbach, Test, Albritton & Herbert

[57] ABSTRACT

A bi-propellant self-contained propulsion system is provided for powering rockets. A plurality of turbopump assemblies are provided to take liquid propellants from low pressure storage tanks to a substantially higher pressure thrust chamber. Substantially all of the liquid propellants are pressurized and gasified within the plurality of turbopumps. Substantially all of the gasified propellants are then used to drive the turbopumps that pressurize the liquid propellants. Gasification preferably occurs within a preburner internal to the turbopump assembly that combines a small portion of one of the propellants with a substantial portion of the other. The proportions are selected so that gasification of all of the propellants is ensured yet relatively low preburner temperatures are maintained. A multi-stage pintle assembly may be provided to vary the exit-to-throat area ratio of the nozzle. The total thrust and the mixture ratio may be controlled by shutting down some of the turbopumps. Actuation of the pintle is preferably coordinated with the shutting down of turbopumps to maintain a relatively constant thrust chamber pressure. A nozzle skirt insert is provided to enhance the low altitude performance of the rocket engine and the high altitude performance of the rocket engine.

25 Claims, 5 Drawing Sheets

FIG.—1

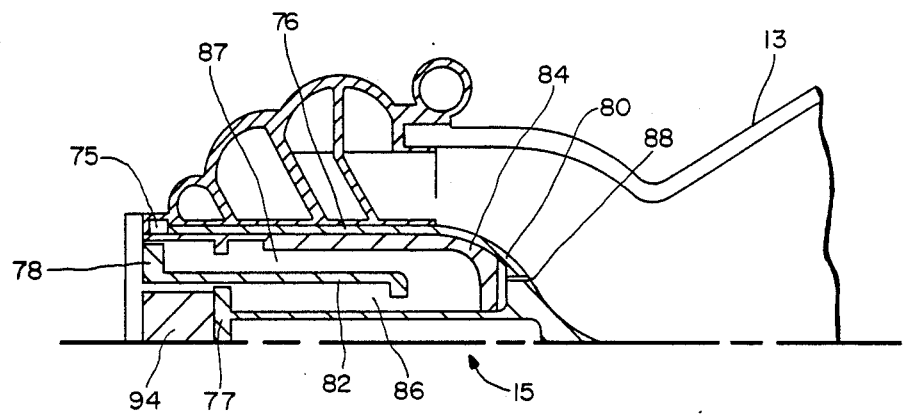
FIG.—4A
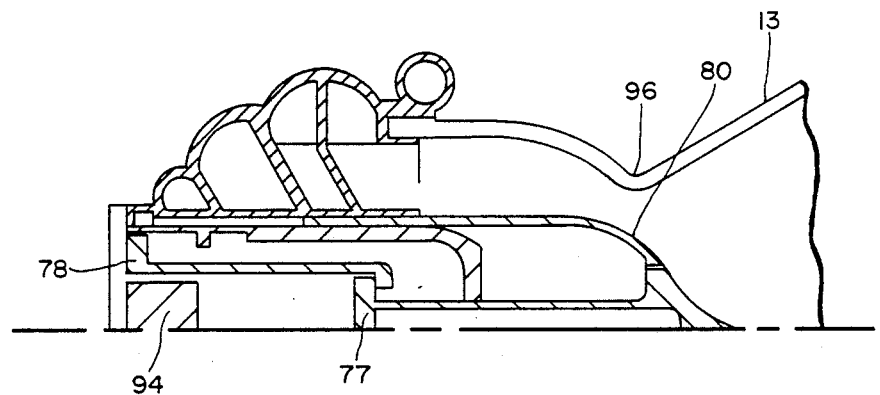
FIG.—4B
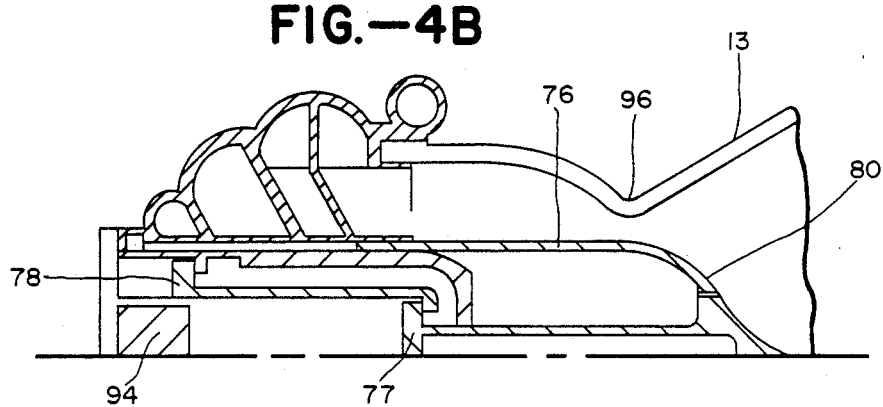
FIG.—4C

BOOSTER-SUSTAINER ROCKET ENGINE AND METHOD

BACKGROUND OF THE INVENTION

The present invention relates generally to a liquid rocket propulsion system. More particularly, the invention relates to an improved delivery system for conveying the liquid propellants to the thrust chamber and an improved nozzle assembly.

Existing rocket vehicles typically include lower stage booster rocket engines used in conjunction with upper stage sustainer engines. Generally, the booster engines incorporate lower performance, high bulk density propellants, while high-performance liquid propellants tend to be used for the sustainer engines. Hydrogen is the preferred fuel for high-performance liquid rocket engines due to its high thrust per unit of propellant mass flow. However, since the density of hydrogen is very low (only 4.4 lb/ft$^3$), a relatively large fuel tank is required. In contrast, liquid booster engines often select lower performance fuels such as kerosene because the fuel tank size may be reduced to about one-fourth the size necessary for a corresponding hydrogen tank.

During the past several years NASA and its contractors have been studying relative performance of liquid oxygen/hydrocarbon fuels in booster rocket engines using hydrocarbon fuels such as kerosene (RP-1), propane, and liquid methane. The choice for the best hydrocarbon fuel typically depends upon the selection criteria. A problem associated with the use of hydrocarbon fuels is that they tend to "coat" the inside walls of the coolant channels of the thrust chamber. To overcome this difficulty, a small amount of liquid hydrogen (about 2%) is often assumed to be included with the propellants supplied to cool the thrust chambers. However, such a system requires a tri-propellant booster engine that is complex and potentially unreliable since it requires three propellant tanks and feed systems instead of just two.

As a result of its superior cooling capacity the popularity of liquid hydrogen as a booster rocket fuel has increased in recent years. However, a major drawback of using liquid hydrogen is the required size of its storage tank. Therefore, several attempts have been made to reduce the required size of hydrogen fuel booster tankage. One approach is to operate the liquid oxygen/liquid hydrogen (LOX/LH$_2$) booster rocket at an oxidizer-rich mixture ratio such as 12:1, as opposed to the typical 6:1 fuel rich mixture ratio. At the higher mixture ratio, the overall bulk density of the propellants are approximately 33 lb/ft$^3$ as opposed to the 22 lb/ft$^3$ bulk density of propellants mixed at the lower mixture ratio. The rocket engine thrust per unit engine weight is increased by about the same proportion. A drawback of the higher mixture ratio is that its specific impulse is reduced. However, it remains higher than the specific impulse of liquid oxygen/hydrocarbon booster engines.

For single stage to orbit vehicles of the future, there is a need for a rocket engine that can effectively operate during both the booster and sustainer phases of flight. Combined booster/sustainer rocket engines encounter performance limitations associated with their need to operate both within and outside of the atmosphere. The varying atmospheric pressure at the rocket nozzle exit plane changes the optimum exit-to-throat area ratio from less than 20:1 to more than 100:1 as the vehicle travels from sea level to high altitudes. Concurrently the thrust requirements for the vehicle decrease due to the reduced vehicle mass as a substantial percentage of the propellants are burned, and decreasing gravitational considerations. Therefore, there is a need to provide a booster/sustainer rocket engine having variable thrust capabilities and the capacity to vary the effective nozzle exit-to-throat area ratio.

SUMMARY OF THE INVENTION

Accordingly, it is a primary objective of the present invention to provide a single rocket engine that performs well during both booster and sustainer flight modes.

Another object of the invention is to provide a liquid rocket propulsion system that is capable of using a single bi-propellant combination for both the booster and sustainer flight phases by merely changing the propellant mixture ratio.

Another object of the invention is to provide a liquid rocket engine capable of varying the effective throat area of the nozzle to facilitate operation over a wide variation of engine thrust levels and to provide a variable exit-to-throat area ratio for more effective matching of the nozzle exit plane pressure to the ambient pressure.

Another object of the invention is to provide a full flow propellant delivery system that gasifies the propellants prior to introduction into the main combustion chamber and utilizes energy extracted from the gasified propellants to pressurize the liquid propellants.

Another object of the invention is to provide a reusable rocket engine that is particularly reliable and low in cost.

Another object of the invention is to provide a propellant delivery system that introduces the propellants into the main combustion chamber in gaseous form to enhance the combustion process for better combustion stability and performance.

Another object of the invention is to provide a reusable liquid rocket propulsion system that is inherently safe during operation, and easily maintained between operations.

Another object of the invention is to provide a design of a rocket engine that facilitates simple operating transition from the booster phase of flight to the sustainer phase of flight.

To achieve the foregoing and other objects and in accordance with the purpose of the present invention, a bi-propellant self-contained rocket propulsion system is provided that includes an oxidant stored in an oxidant tank and a fuel stored in a fuel tank apart from the oxidant. A combustion means that includes a thrust chamber is provided for mixing and burning the propellants to produce combustion products. A nozzle assembly expands the combustion products from the propulsion system to produce thrust.

A delivery means is provided for supplying the propellants to the combustion means. The delivery means includes a plurality of turbopumps for pumping the liquid propellants to operational pressures. Each turbopump includes a preburner for combusting a portion of the oxidant with a portion of the fuel to produce a gasified fluid flowstream, a pump impeller for pressurizing one of the propellants, and a turbine wheel for extracting energy from the gasified flowstream to drive the pump impeller, whereby substantially all of the propellants are gasified within the turbopumps before being delivered to the combustion means. Each of the propellants being pressurized and gasified within the turbopump it drives.

The plurality of turbopumps include at least two oxidant turbopumps and at least one fuel turbopump. Each oxidant turbopump combines a small portion of the fuel with a substantial portion of the oxidant to produce an oxidant-rich fluid flowstream. Similarly, each fuel turbopump combines a small portion of the oxidant with a substantial portion of the fuel to produce a fuel-rich fluid flowstream.

In a preferred embodiment of the propulsion system, each turbopump assembly includes a drive shaft that connects the turbine rotor to the pump impeller and a plurality of bearings for supporting the drive shaft, impeller and rotor. A cooling means cools the bearings by passing appropriate liquid propellant over the bearings. Most preferably, each oxidant turbopump uses a small portion of the liquid oxidant as its bearing cooling fluid while each fuel turbopump utilizes a small portion of the fuel as its cooling fluid. Such an arrangement reduces the sealing requirements for the turbopumps since the risks that a fluid leaking within the turbopump will cause an explosion is substantially reduced.

In a preferred method aspect of the invention all of the fuel and oxidant turbopumps are operated at preselected flowrates. The turbopump flowrates are selected to provide an oxidant rich mixture within the combustion means during the booster phase of the flight. A primary group of at least one of the oxidant turbopumps are shut down while the remaining turbopumps (both fuel and oxidant) continue to operate substantially at the preselected flowrates used during the booster phase of the flight. The preselected flowrates of the remaining turbopumps are selected such that the combustion means is provided with a fuel rich mixture during the sustainer phase of the flight.

Preferably, an additional oxidant turbopump may be shut down simultaneously with a fuel turbopump in order to reduce total thrust without significantly altering the fuel/oxidizer mixture ratio within the combustion means during the sustainer phase of the flight.

In another preferred aspect of the invention, nozzle throat area trimming means is provided for varying the exit-to-throat area ratio of the nozzle. The nozzle trimming means includes a movable pintle mounted within the nozzle assembly for movement relative to the longitudinal axis of the nozzle to vary the effective throat area within the nozzle. Preferably the pintle includes a multistage actuator that facilitates moving the leading edge of the pintle to discrete positions within the nozzle. In a preferred method aspect of the pintle's use, the movements of the pintle are coordinated to occur simultaneously with the shutdown of various turbopumps to maintain pressure within the combustion means.

In another aspect of the invention, an expendable insert is positioned within the thrust chamber skirt. When in place, the insert geometry limits the expansion area ratio to less than 20:1. When the insert is expended and expelled from the skirt, the resulting expansion area ratio exceeds 100:1.

BRIEF DESCRIPTION OF THE DRAWINGS

The features of the present invention that are believed to be novel are set forth with particularity in the appended claims. The invention, together with further objects and advantages thereof, may best be understood by reference to the following description of the presently preferred embodiment taken in conjunction with the accompanying drawings in which:

FIGS. 4A–C are schematic side views of a pintle nozzle arrangement constructed in accordance with the present invention displaying three different extensions.

DETAILED DESCRIPTION OF THE DRAWINGS

Figure 1:
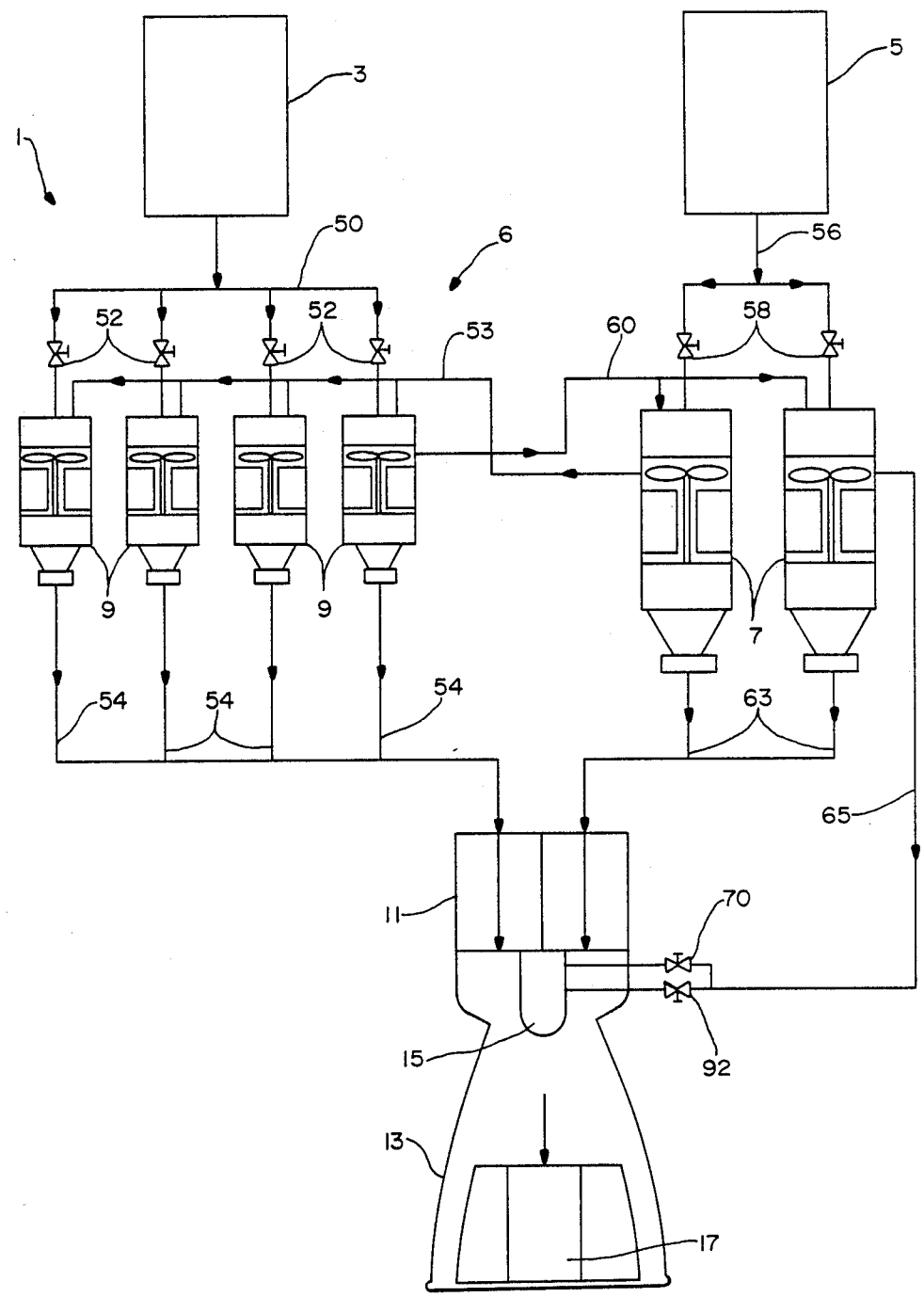
FIG. 1 is a schematic diagram of a liquid rocket propulsion system designed in accordance with the present invention.

As illustrated in the drawings, a preferred embodiment of the liquid rocket propulsion system 1 of the present invention includes an oxidizer storage tank 3 for storing a liquid oxidant, a fuel storage tank 5 for storing a liquid fuel, a propellant delivery system 6 that includes a plurality of fuel turbopumps 7 and a plurality of oxidant turbopumps 9, a main thrust chamber 11, a nozzle assembly 13, a pintle 15 and a nozzle skirt insert 17.

Referring first to FIG. 1, the liquid propellants are stored at relatively low pressures in separate storage tanks 3,5. The preferred oxidant is oxygen while the preferred fuel is hydrogen. The propellant delivery system 6 provides the liquid propellants from their respective storage tanks 3 and 5 to the thrust chamber 11 and is arranged as a full flow cycle. An essential feature of the full flow cycle is that substantially all of the liquid propellants are pressurized and gasified by the turobpumps prior to entering the main thrust chamber 11 and the gasified fluids are used as the drive energy to power the fuel and oxidizer turobpumps.

The full flow cycle is accomplished by using a plurality of turbopumps in the form of fuel turbopumps 7 and oxidant turbopumps 9. Within each fuel turbopump 7, a substantial portion of the liquid fuel is combusted with a small portion of the oxidizer to gasify the fuel and to form a fuel-rich fluid flowstream that drives the turbine that powers the fuel pump. Contemporaneously, a substantial portion of the liquid oxidizer is combusted within each oxidizer turbopump 9 with a small portion of the fuel to form an oxidizer-rich drive fluid for powering the turbines that drive the oxidizer pumps. The fuel-rich and oxidizer-rich fluid flowstreams are all delivered to the main thrust chamber 11 where they are combined and burned. The combustion products produced within the thrust chamber are expanded through a convergent-divergent nozzle 13 to create a high velocity gas jet which provides the engine thrust. The full flow cycle provides substantial advantages over existing engine cycles which use substantially less than all of the propellants as the turbine drive fluids and in some cases, do not burn the turbine exhaust fluid to obtain the maximum possible thrust.

One of the primary advantages of using essentially the entire propellant supply as drive fluids for the pump turbines is that the turbine inlet temperatures and pressures may be substantially lower than the turbine inlet temperatures and pressures that are necessary in prior art systems. This is due to the fact that substantially larger drive fluid mass flowrates are used in the full flow cycle. Lower turbine inlet temperatures are advantageous since they extend turbine life and are conducive to increased engine reliability and safety. Additionally, the moderate operational temperatures of the turbines allow a much wider choice of materials for both the turbines and the piping between the turbines and the main thrust chamber 11. This is particularly important for the fuel-side turbine, since it allows the selection of materials such as A-286 or nickel which are not subject to hydrogen embrittlement. As will be appreciated by those skilled in the art, the ability to select from a wider choice of materials to avoid hydrogen embrittlement is a substantial advantage. It is also important for the oxidant-side turbine because it allows selection of lower temperature materials such as coppers and nickel alloys which are oxidation resistant.

As shown in FIG. 1, a booster-sustainer propulsion system 1 utilizes a plurality of turbopump assemblies to feed propellants to a single main thrust chamber 11. Multiple turbopumps provide a practical, efficient, and low weight means for supplying a wide range of flow rates and mixture ratios to the thrust chamber 11. With such a construction, only one oxidizer turbopump and one fuel turbopump assembly need be developed to provide the basis for a reliable rocket engine with a wide range of thrusts and specific impulses. Multiple turbopump assemblies provide a means to change the mixture ratio from a high mixture ratio to a more conventional mixture ratio merely by shutting down one or more of the oxidizer turbopumps. By way of example, an oxidizer-rich mixture having a oxidant-to-fuel mixture ratio of 12:1 would be suitable for the booster phase, while a fuel rich mixture having an oxidant-to-fuel mixture ratio of 6:1 is more appropriate for the sustainer phase of flight.

In the embodiment shown in FIG. 1, four oxidant turbopumps 9 are provided along with two fuel turbopumps 7. Liquid oxygen flows from the oxidizer storage tank 3 through oxidizer supply lines 50 into each of the oxidizer turbopump assemblies 9. Each oxidizer supply line 50 includes a stop valve 52 which may shut down oxidizer flow to its associated turbopump assembly 9. Within each oxidant turbopump 9, a substantial portion of oxidizer is mixed and combusted with a small portion of hydrogen to gasify the liquid oxygen. The hydrogen fuel is tapped from one of the fuel turbopumps 7 between the fuel pump impeller 18 and the preburner 20 and is delivered through fuel delivery line 53 as a high pressure liquid. This cold, high pressure fluid may be used to regeneratively cool the combustion chamber 11 and the nozzle 13 prior to being used as a propellant. The regenerative coolant flow circuit is not shown in FIG. 1. As described below, the resultant oxidant-rich mixture is passed through a turbine which drives the oxidant pump and is exhausted through piping 54 into thrust chamber 11.

Concurrently, liquid hydrogen is provided from fuel storage tank 5 through fuel supply lines 56 into each of the fuel turbopump assemblies 7. Each fuel supply line 56 includes a stop valve 58 which may shut down fuel flow to its associated turbopump assembly 7. A small portion of liquid oxygen is tapped from an oxidant turbopump 9 as a high pressure liquid and is provided by oxidant delivery line 60 to each of the fuel turbopump assemblies 7. Sufficient oxidant is provided to ensure that when mixed with the hydrogen fuel, the uncombusted fuel will be gasified. The resultant fuel-rich flowstream is channeled through a turbine which drives the fuel pump. The fuel-rich mixture is then channeled through gas duct 63 into thrust chamber 11 where it is mixed and combusted with the oxidant rich flowstream provided by oxidant piping 54.

The propulsion system is balanced such that when one or more of the turbopumps is shut down, the turbopumps that remain operational will continue to function as if no change had occurred. This is possible due to the pintle nozzle assembly 15 which is adjusted to maintain an essentially constant back pressure within thrust chamber 11 as discussed below.

An engine control system 70 is adapted to monitor the health of the various turbopumps. The oxidant turbopumps selected for shut down may be chosen randomly if none are experiencing difficulties. If, however, one or more of the turbopump assemblies is having trouble, the troubled turbopump(s) would be the first to be shut down. It will be appreciated that redundancy of the propellant feed systems is inherent with such a system. This is important to the overall safety and reliability of the rocket engine since historically propellant feed system components have been much more prone to failure than major structural components such as the thrust chamber or the nozzle assembly.

Figure 2:
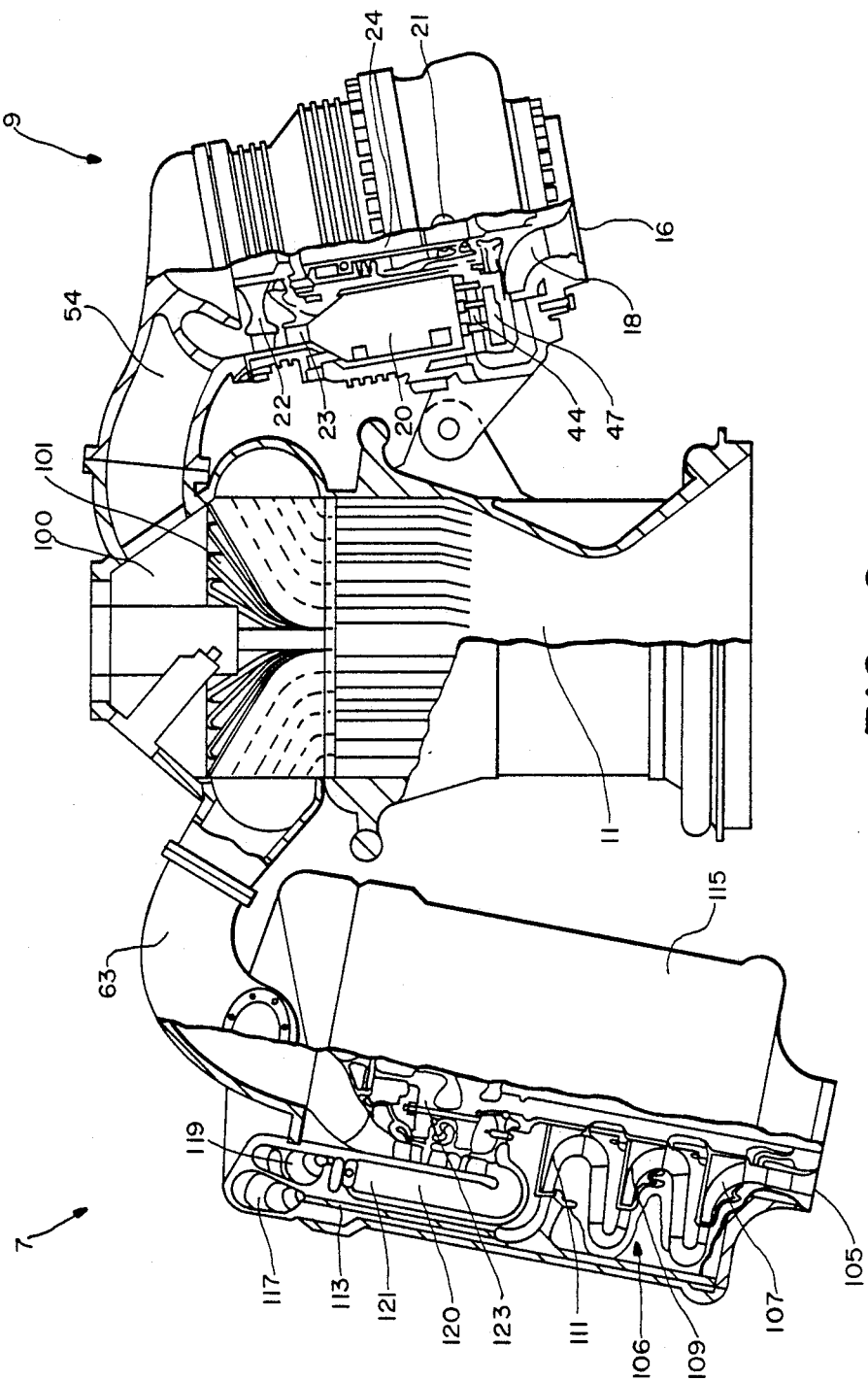
FIG. 2 is a partially broken away side view of a turbopump and thrust chamber arrangement designed in accordance with the present invention.
Figure 3:
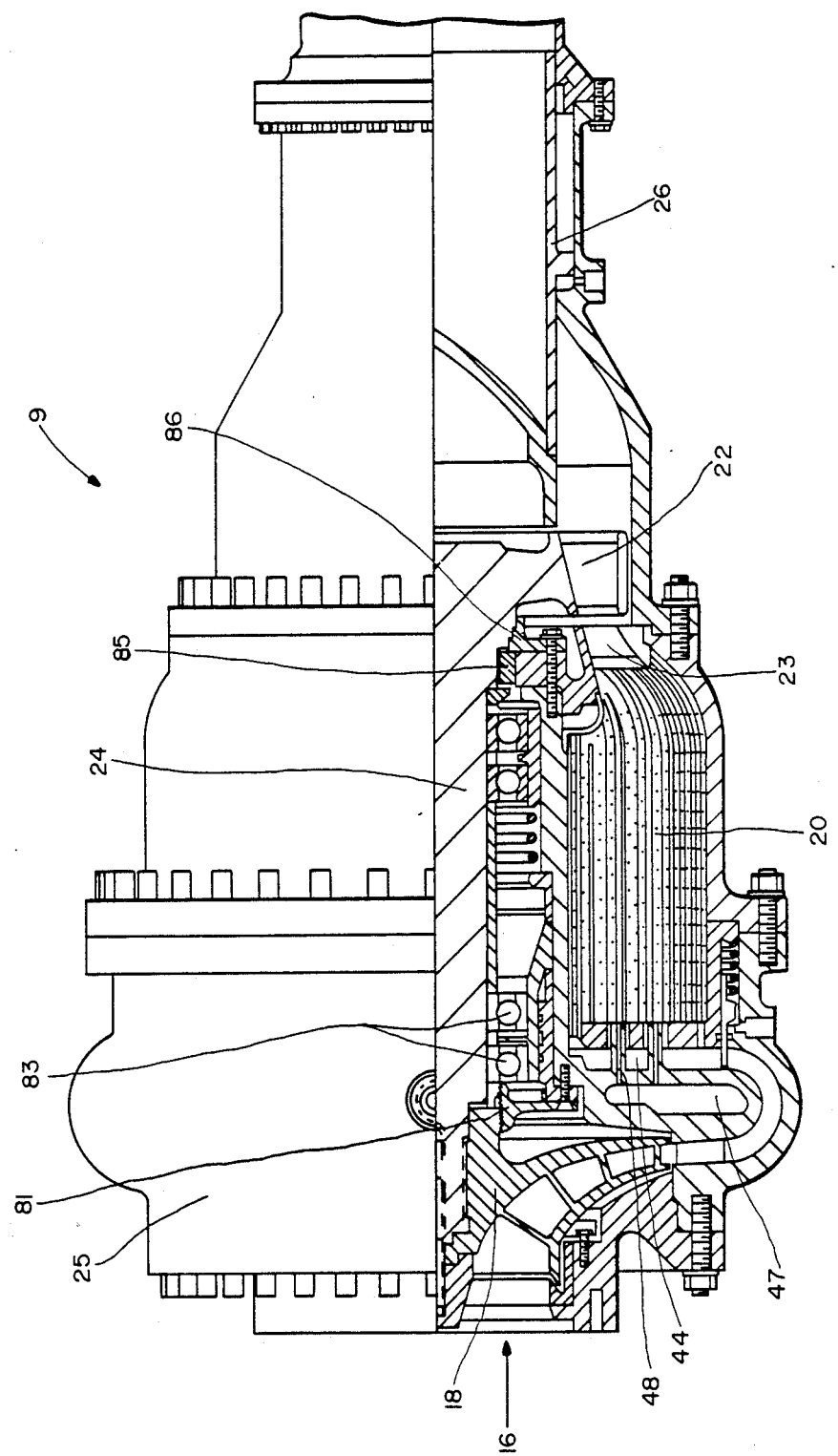
FIG. 3 is a partially broken away side view of the oxidant turbopump shown in FIG. 3.

Referring next to FIGS. 2 and 3, the general construction of the turbopumps will be described. For purposes of clarity, FIG. 2 shows a single oxidant turbopump 9 along with a single fuel turbopump 7. FIG. 3 shows a more detailed view of a preferred oxidant turbopump. Liquid oxygen is delivered from oxidizer storage tank 3 through oxidizer supply line 50. The low pressure liquid oxygen is introduced to oxidant turbopump 9 through an inlet 16 for pump impeller 18. The pumping action of impeller 18 raises the liquid oxidant to operational pressures. The high pressure liquid oxygen flows into a pump stator 40 which slows the flow thereby increasing the static pressure and guides the oxygen flow through a shutoff valve 43. When the shutoff valve 43 is opened, the oxygen flows directly through an injector manifold 44 into preburner 20. Liquid oxygen also flows along the outside of the preburner chamber liner and enters the chamber through perforations distributed throughout the liner. This secondary flow of liquid oxygen quenches the hot gases produced in the combustion zone and is warmed in the process. A small amount of the fuel propellant is delivered at a controlled pressure to fuel inlet port 21 through fuel delivery line 53. The fuel flows through a fuel injector manifold 47 and injection tubes 48 into preburner 20. The fuel is shown to be injected coaxially with liquid oxygen. However, it should be appreciated that a wide variety of alternative injection patterns could be used as well. Ignitor port 49 is provided in the side of preburner 20 for igniting the hydrogen/oxygen mixture in a conventional manner. Complete combustion of the hydrogen is accomplished with the low fuel/oxidizer ratios used within the preburner. However, it is preferred that the combustion products thoroughly mix with the unburned oxygen to ensure that it is heated and gasified to a homogenous fluid state.

The design of the preburner 20 contemplates two distinct processes, each of which occurs within a specific zone of the preburner. The first process is the combustion process, wherein all the injected fuel will be burned in a local region. Such combustion is intended to occur in a centralized zone isolated by the cold raw liquid oxygen so that the hot flames do not contact the burner wall. By way of example, a suitable oxygen to hydrogen mixture ratio of 40:1 is appropriate. (This contrasts with a stoichiometric mixture ratio of 8:1).

The second process is the mixing, heating and vaporization of the remaining oxygen. Preferably, the oxygen is injected into the preburner 20 as fine spray droplets and strongly mixed with the gases from the combustion zone. The gases produced by the combustion process are then mixed and quenched with the additional oxygen flow entering the preburner chamber until a uniform "warm" flow of oxidant rich gas results. The mixing may be accomplished by a wide variety of well-known mixing techniques that rely primarily on injector configuration. Additionally, baffles or other deflectors may be placed into the flow path to enhance mixing and gasification.

After combustion and vaporization, the warm oxidant-rich gases flow out of preburner 20 through turbine nozzle 23 and impinge upon turbine wheel 22 thereby causing the turbine and its shaft 24 to rotate. The turbine shaft 24 is coupled directly to the pump impeller 18 and therefore provides the pumping necessary to pressurize the oxidant to the preburner's working pressure.

The rotating assembly that includes pump impeller 18 turbine wheel 22 and drive shaft 24 is supported within a turbopump housing 25 by a plurality of bearings 83 which are cooled by a stream of liquid oxidant. A small amount of liquid oxygen is tapped from the pump stator 40 and is directed through control labyrinth 81, the bearings 83, liftoff seal 85 and a back pressure labyrinth 86, the cooling fluid oxygen is then exited into the turbine cavity where it is assimilated and gasified by the oxidant-rich mixture driving the turbine.

It will be appreciated that the pressures within the various turbopump cavities act on the rotor to produce axial thrust loads. Conical springs 88 in each bearing set are arranged to permit limited axial shaft movement, thereby serving to damp and stabilize dynamic shaft motion. The turbopump housing 25 and its flow passageways are symmetric about the centerline, which simplifies manufacturing and avoids radial hydraulic loads on the rotating assembly. The liquid oxygen cooled bearings and the lift-off seal provide a favorable environment for long bearing and seal service life. Materials suitable for the turbopump assembly include monels, nickels, coppers and inconels that are compatible with oxygen-rich environments. Further, since liquid oxidant used to cool the drive shaft bearings is the same as the gaseous oxidant driving the turbine, they are compatible and there is little danger of explosion in the turbopump. Therefore, the extensive positive shaft sealing requirements typical of many turbopump designs are substantially reduced or eliminated.

After exhausting from the turbine, the oxidant-rich gas flows through piping 54 into a main thrust chamber injector 100. The fluid flow passes between main injector vanes 101 and into the thrust chamber 11, where it burns with the fuel-rich fluid flowstreams being produced as described below.

Low pressure liquid hydrogen is delivered to fuel turbopump 7 through fuel supply lines 56. The liquid hydrogen enters the turbopump through an inlet 105 and passes through an impeller 106 having three stages 107, 109 and 111. The flow is then routed through channels 113 in the walls of turbopump housing 115 into exit collector 117. A portion of the liquid hydrogen then passes through a shutoff valve (not shown) and through a regenerative cooling jacket for the thrust chamber, i.e., the combustion chamber-nozzle. The liquid hydrogen thus acts as a coolant for the thrust chamber absorbing heat from its walls. The hydrogen is then returned to the fuel turbopump 7 via a return manifold 119 or the coolant hydrogen is returned to the system downstream of the hydrogen turbine into the line 63 of FIG. 1. For rocket engines with thrusts in the range of 300,000 lb. thrust and larger, the portion of the hydrogen used to regeneratively cool the thrust chamber nozzle is about 20 percent. From the return manifold, the liquid hydrogen is injected into the preburner combustion zone 121 where it burns with a small amount of pressurized liquid oxygen tapped from one of the oxidant turbopumps 9. A fuel-rich fluid flowstream results from the mixing and gasification of the propellants within preburner 120 in the same manner as described with respect to the oxidant turbopump assembly. The fuel-rich fluid flowstream drives turbine wheel 123 to provide the necessary pumping power for impeller 106. The fuel-rich flowstream then exits the turbopump and flows through gas duct 63 into the interior of the main injector 100. The fuel-rich flowstream passes through the interior of vanes 101 of main injector 100 and out their bottom edges into the thrust chamber 11 to burn with the oxygen-rich flowstreams previously described.

It will be appreciated that many other injector arrangements for injecting the propellant gases into the main combustion chamber may be utilized with the scope of this patent. Concentric ring patterns, cheveron patterns, wedge patterns, etc., all of which introduce alternate streams or sheets of each propellant gas is the underlying principal.

The turbopumps described herein are particularly advantageous in rocket propulsion systems. They are both compact and light in weight. By incorporating a preburner into the pump housing, major savings in weight, costs, and complexity are achieved since the pump housing serves multiple purposes. The propellant flows are kept within the pump housing to the extent possible to minimize the required external ducting, thereby avoiding extra costs, reducing overall weight and reducing the system's leak potential.

As previously mentioned, the optimal nozzle design expansion area ratio varies significantly between the booster and sustainer phases of the flight. Therefore, a mechanism is provided for varying the effective exit-to-throat area ratio during the course of a flight. A pintle assembly 15 suitable for altering the effective exit-to-throat area ratio of the nozzle is shown in FIGS. 4A-C. The pintle nozzle 15 has three discrete axial positions which, in turn, facilitate three specific nozzle throat areas. In the retracted position, the pintle is withdrawn completely from the throat flow path. Hence, the nozzle flow area is at its maximum and the exit-to-throat area ratio is at its minimum. The throat area is designed to provide the correct chamber pressure for the thrust chamber 11 when all of the turbopumps are operating at their normal flow rates. Such an arrangement provides the maximum engine thrust.

Within the earth's atmosphere during the booster phase of a flight, all of the turbopumps are operated at their design capacity. With all turbopumps fully operational, the oxygen/hydrogen mixture ratio is about 12:1. In flight, after a substantial portion of the propellants have been burned, the reduced mass of the rocket together with reduced gravitational considerations make it necessary to reduce thrust during the sustainer phase of the flight to avoid exceeding acceleration limits for the vehicle and/or its cargo.

As previously discussed it is desirable to use a fuel-rich mixture during the sustainer phase of a flight in order to gain the benefits of a higher exhaust gas specific impulse. To switch to a fuel-rich thrust chamber mixture ratio, a primary group of oxidant turbopumps are shut down. Each oxidant turbopump preferably has the same preselected design flow rate and half of the oxidant turbopumps are within the primary group. With such an arrangement, the total oxidant flow rate is halved while the hydrogen flow rate remains the same. In this manner, the oxidant/fuel mixture ratio is reduced to 6:1 by weight flowrate ratio, thereby providing the desired fuel-rich sustainer rocket mixture. To maintain a relatively constant chamber pressure and turbopump operation, the pintle 15 is partially inserted into the nozzle throat, thereby reducing the throat cross sectional flow area to approximately two thirds of its maximum area. The nozzles exit to throat area ratio is thus increased by a factor of about 1.5. The change in the mixture ratio and the change in area ratio have the effect of increasing the engine's specific impulse.

Later in the flight, the number of turbopumps in operation can be decreased to one oxidizer and one fuel turbopump with a corresponding reduction in the engine flow rates and thrust. At such a time, the pintle is fully extended into the throat area, thereby reducing the throat area by a factor of another half. This movement of the pintle maintains the thrust chamber pressure and doubles the exit-to-throat area ratio, thereby improving nozzle/engine performance. It will be appreciated that it is important to maintain a relatively constant engine chamber pressure when shutting down the turbopumps in order to maintain balance within the turbopumps. Near liftoff, the desired exit to throat area ratio is generally in the range of about 20:1–30:1, whereas outside of the atmosphere exit-to-throat area ratios of 100:1 or greater are desirable.

Referring next to FIG. 4, the construction of the pintle 15 will be described. The pintle 15 includes a pintle casing 75 with an exterior wall 76. A shoulder 80 is formed at the leading edge of the exterior wall 76 of casing 75. A pair of concentric cylindrical pistons 77 and 78 are disposed within the casing 75 and are adapted to move longitudinally therein in telescopic fashion. The outer piston 78 includes a primary stop 82 that extends beyond its top. Primary stop 82 forms a cylindrical bore 86 for receiving interior piston 77. Interior piston 77 is thus able to slide longitudinally within the cylindrical bore 86 until it abuts against the free end of the primary stop 82. Similarly, outer piston 78 which carries primary stop 82 is free to travel longitudinally within a substantially cylindrical cavity 87 formed within a secondary stop 84 that limits the movement of the outer piston 78. The secondary stop 84 is disposed within the pintle casing 75. Cooling vents 88 are provided in the casing 75 as well as the inner and outer pistons 77, 78 to allow some fluid flow through the pintle assembly 15.

Pressurized liquid fuel tapped from one of the fuel turbopump 7 and supplied via actuator piping 65 may be used to actuate the cylindrical inner and outer pistons 77 and 78. During initial operation (i.e., the beginning of the booster phase), the coaxial pistons 77 and 78 are pressure forced in a retracted position. To extend the pintle, a valve 70 on actuator piping 65 is opened to pressurize a chamber 90 within inner piston 77. Since the actuator piping 65 feeds the pintle 15 with high pressure liquid fuel, the piston has sufficient pressure to fully extend itself. To extend the outer piston 78, valve 92 on actuator piping 65 is opened to transmit the fuel propellant into chamber 94 in front of outer piston 78. The pressure exerted against outer piston 78 causes it to move longitudinally within cavity 87 until it abuts against secondary stop 84.

As discussed above, when switching to the sustainer phase of flight, one or more of the oxidant turbopumps are shut down. This substantially reduces the total propellant mass flow which, without compensation, would significantly reduce the pressure within thrust chamber 11 and adversely affect the system's balance. However, the pintle is designed to help maintain the engine chamber pressure when reducing thrust. Therefore, in one of the preferred methods of operation, the inner piston 77 of pintle 15 is actuated simultaneously with the shutting down of the primary group of oxidant turbopumps when transitioning from an oxidant rich booster mixture to a fuel rich sustainer mixture. As seen in FIG. 4B, the inner piston 77 of pintle 15 is adapted to extend the shoulder 80 partially into the nozzle throat 96 thereby reducing the throat area and increasing the resistance provided to the exhaust gases. The lowered throat area increases the exit-to-throat area ratio of the nozzle thereby enhancing performance at altitude.

When additional turbopumps are turned off, the outer piston 78 is actuated to fully extend the pintle such that exterior wall 76 of pintle casing 75 extends fully into the throat area as shown in FIG. 4C. This minimizes the total throat area thereby maximizing the nozzle's exit-to-throat area ratio and increasing performance at extremely low ambient pressures. It will be appreciated that the actual size of the pintle may depend in part on the desired thrust chamber back pressure since the total nozzle throat area will have a substantial impact on the nozzle's back pressure.

By way of example, in the embodiment described, four oxidant turbopumps are provided along with two fuel turbopumps. Preferably the oxidant turbopumps are identical to one another, and similarly, the fuel turbopumps are identical to each other. With all of the turbopumps operating at their designed flow rates during the booster phase, the propellants are mixed to form an oxidizer-rich mixture with an oxygen/hydrogen mixture ratio of 12:1 by weight. During the booster phase the pintle is completely withdrawn so that it does not interfere with the nozzle throat 96. When shifting to the sustainer flight phase, two of the oxidant turbopumps are shut down and simultaneously one of the pintle stages is extended. The shutting down of two turbopumps reduces the engine mixture ratio to 6:1 by weight.

Later in the flight, the rocket thrust is further reduced by shutting down another one of the oxidant turbopumps, along with one of the fuel turbopumps. With such an arrangement, the propellant mixture ratio remains at 6:1. A second pintle stage is extended simultaneously with shutting down the additional turbopumps, thereby further increasing the exit-to-throat area ratio and hence the rocket performance. A liquid propellant, preferably the fuel, is used to both actuate and cool the pintle assembly 15. Actuation is accomplished by activating valves 70 and 92 to actuate the inner and outer piston 77 and 78 respectively. Cooling vents 88 in casing 75, as well as inner and outer piston 77, 78 allow some of the fluid to leak through the pintle and into the nozzle 13. Cooling vents 88 are sized to allow sufficient leakage from the pintle 15 to provide cooling. The coolant fuel is easily assimilated by the high temperature exhaust gases.

Figure 5:
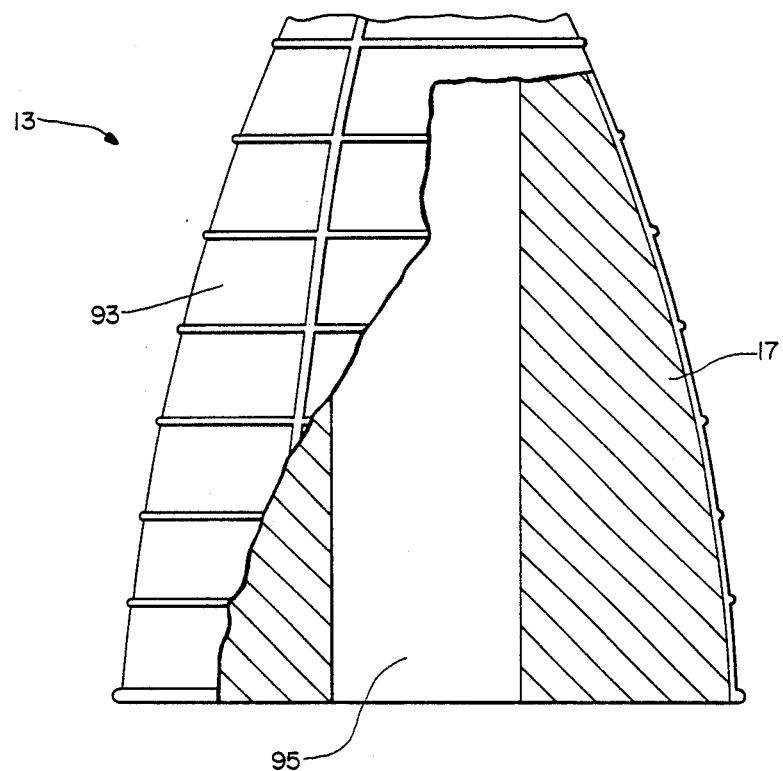
FIG. 5 is a diagrammatic partially broken away side view of a nozzle assembly including a nozzle skirt insert for improving liftoff thrust and altitude performance.

Referring next to FIG. 5, an alternative or adjunct to the pintle is a nozzle skirt insert 17. The nozzle skirt insert is essentially a cylindrical member that is adapted to fit within a large diameter skirt 93 of nozzle 13. The nozzle skirt insert 17 includes a central bore 95 that provides a temporary flow path for the rocket engine exhaust during the early part of the booster phases of the flight. The central bore remains at a pressure substantially equal to atmospheric pressure. Thus, the internal static pressure on the nozzle skirt is substantially the same as the ambient pressure and thus, the nozzle skirt does not cause drag or reduce engine performance. The short period of service required of the nozzle skirt insert allows the use of ablative materials for insert construction. Thus, the nozzle skirt insert does not require active cooling. When the rocket vehicle reaches a predetermined altitude, the nozzle skirt insert can be ejected allowing the exhaust gases to fill the entire nozzle skirt 93 thereby providing the high exit-to-throat area ratio desired to provide high performance at high altitude. The nozzle skirt insert may be constructed of a carbon-carbon or similar material having a low ablation rate, so that it will retain very nearly its initial dimensions during that part of the flight.

Although only one embodiment of the present invention has been described herein, it should be apparent to those skilled in the art that the present invention may be embodied in many other specific forms without departing from the spirit or scope of the invention. Particularly, it should be understood that the specific numbers of oxidizer and fuel turbopump assemblies may be widely varied in accordance with the needs of a particular propulsion system. Similarly, the various turbopump assemblies may be shut down on an individual basis or their power output may be gradually reduced in the manner commonly known as throttling. It will also be apparent to those skilled in the art that the speed of the turbine and thus the volume of propellant pumped may be regulated by controlling the amount of the second propellant introduced into the preburner assembly. Therefore, by regulating fuel input to the oxidizer turbopumps and the oxygen input to the fuel turbopumps, the total mass flowrate into thrust chamber 11 can be easily regulated.

Additionally, it will be appreciated that in the broad application of the system, the turbopump designs can be widely varied in size and configuration. Further, the nozzle performance can be widely adjusted through the combined use of the pintle with a nozzle skirt insert. Therefore, the present examples and embodiments are to be considered illustrative and not restrictive and the invention is not to be limited to the details given herein, but may be modified within the scope of the appended claims.

We claim:

1. In a liquid rocket propulsion system that includes at least two liquid propellants in the form of an oxidant stored in an oxidant tank and a fuel stored in a fuel tank apart from said oxidant, combustion means for mixing and burning said propellants to produce combustion products, said combustion means including a thrust chamber wherein at least a portion of the burning occurs, and a nozzle assembly for expelling the combustion products from the propulsion system to produce thrust, the improvement comprising delivery means for supplying the propellants to the combustion means and for enhanced expulsion from the combustion means, the delivery means comprising:
    a plurality of turbopumps for pumping the liquid propellants to operational pressures, each said turbopump including,
    a pump impeller for pumping one of the propellants to an operational pressure,
    a preburner for combusting a portion of the fuel with a portion of the oxidant to produce a gasified fluid flowstream, and
    a turbine wheel for extracting energy from the gasified flowstream to drive the pump impeller;
    means for carrying the fluid flowstreams from said turbopumps to said combustion means; and
    wherein said plurality of turbopumps gasify substantially all of the propellants prior to delivery of the propellants to the combustion means, and the plurality of turbopumps include at least one oxidant turbopump, each said oxidant turbopump combining and combusting a small portion of the fuel with a substantial portion of the oxidant within its preburner to produce a gasified oxidizer-rich flowstream, and at least one fuel turbopump, each said fuel turbopump assembly combining and combusting a small portion of the oxidizer with a substantial portion of the fuel within its preburner to produce a gasified fuel-rich flowstream.

2. A propulsion system as recited in claim 1 further comprising a plurality of fuel turbopumps, each said fuel turbopump producing a fuel-rich flowstream.

3. A propulsion system as recited in claim 1 further comprising a plurality of oxidant turbopumps, each said oxidant turbopump producing a oxidant-rich flowstream.

4. A propulsion system as recited in claim 1 further comprising a plurality of fuel turbopumps and a plurality of oxidant turbopumps.

5. A propulsion system, as recited in claim 4 further comprising control means for selectively independently operating said oxidant and fuel turbopumps.

6. A propulsion system as recited in claim 3 wherein said control means is adapted to shut down a primary group of at least one turbopump to vary the fuel/oxidant mixture ratio within the thrust chamber.

7. A propulsion system as recited in claim 6 wherein said control means is adapted to shut down a secondary group of at least one oxidant turbopump and at least one fuel turbopump to vary the thrust without substantially changing the fuel/oxidant mixture ratio.

8. A propulsion system as recited in claim 1 wherein each said turbopump further includes:
    a drive shaft that connects the turbine wheel to the pump impeller;
    a plurality of bearings for supporting the drive shaft; and
    cooling means for cooling said bearings, the cooling means for passing a single one of said liquid propellants over the bearings to facilitate cooling.

9. A propulsion system as recited in claim 8 wherein each said oxidant turbopump assembly passes a portion of the liquid oxidant over its bearings to facilitate cooling, and each said fuel turbopump passes a portion of the liquid fuel over its bearings to facilitate cooling.

10. A propulsion system as recited in claim 1 wherein the oxidant is oxygen and the fuel is hydrogen.

11. A liquid rocket propulsion system comprising:

an oxidant storage tank for storing a liquid oxidant propellant;

a fuel storage tank for storing a liquid fuel propellant;

a multiplicity of turbopumps for pressurizing and gasifying the liquid propellants, each said turbopump including, a pump impeller for pressurizing one of the propellants introduced into the turbopump, a preburner wherein gasification occurs to produce a fluid flowstream, and a turbine wheel for extracting energy from the flowstream to drive the pump impeller;

combustion means for combusting the multiplicity of fluid flowstreams produced by said turbopumps to produce exhaust gases; and nozzle means for expelling the exhaust gases from the propulsion system to produce thrust;

wherein said multiplicity of turbopumps gasify substantially all of the propellants before the propellants are delivered to the combustion means, and the plurality of turbopumps include at least two oxidant turbopumps, each said oxidant turbopump combining a small portion of the fuel with a substantial portion of the oxidant and combusting the mixture within the oxidant turbopump's preburner to produce a gasified oxidizer-rich fluid flowstream, and at least one fuel turbopump that combines a small portion of the oxidizer with a substantial portion of the fuel within the fuel turbopump's preburner to produce a gasified fuel-rich fluid flowstream.

12. A propulsion system as recited in claim 11 wherein said nozzle means includes a nozzle having a throat, a skirt, and an exit outlet, the propulsion system further comprising a movable pintle for disposition within said nozzle assembly for movement relative to the longitudinal axis of the nozzle to vary the effective exit-to-throat area ratio of the nozzle.

13. A propulsion system as recited in claim 12 further comprising a nozzle skirt insert for placement within the nozzle skirt to reduce the nozzle outlet diameter.

14. A propulsion system as recited in claim 12 wherein said pintle includes a first and a second piston that are separately operable whereby actuation of the first piston causes a portion of the pintle to extend into the nozzle throat to reduce the effective nozzle throat area and actuation of the second piston causes a portion of the pintle to further extend into the throat region to further reduce the effective throat area.

15. A propulsion system as recited in claim 14 wherein said pintle is capable of varying the exit-to-throat area ratio from a ratio of less that 20 to 1, to a ratio of greater than 40 to 1.

16. A propulsion system as recited in claim 12 further comprising propellant delivery means for delivering one of said liquid propellants to actuate the pintle.

17. A propulsion system as recited in claim 16 wherein said propellant delivered to the pintle is also used to cool the pintle, and said pintle further includes a plurality of vents for allowing the cooling propellant to leak through the pintle into the nozzle.

18. A propulsion system as recited in claim 11 further comprising a nozzle skirt insert for placement within the nozzle skirt to reduce the nozzle outlet diameter.

19. A propulsion system as recited in claim 11 further comprising controller means for selectively shutting down one or more of the turbopumps.

20. A method of supplying propellant to a liquid rocket having a liquid fuel stored within a fuel storage tank, a liquid oxidizer stored within an oxidizer storage tank, and a nozzle having a throat area and an exit outlet, the method comprising the steps of:

preburning a portion of the fuel with a portion of the oxidant to gasifying substantially all of the propellants to form a plurality of fluid flowstreams;

pressurizing the liquid propellants apart from the storage tanks using substantially all of the gasified propellants as the energy source for pressurizing the liquid propellants;

mixing the fluid flowstreams and combusting the mixture to produce exhaust gases;

expelling the exhaust gases through the nozzle to produce thrust.

21. A method of operating a rocket propulsion system having a liquid fuel stored within a fuel storage tank, a liquid oxidant stored within an oxidizer storage tank, a plurality of oxidant turbopumps for pressurizing the oxidant, each oxidant turbopump producing an oxidant rich flowstream, a plurality of fuel turbopumps for pressurizing the fuel, each fuel turbopump producing a fuel rich flowstream, combustion means for receiving, mixing and combusting the plurality of oxidant rich flowstreams and the plurality of fuel rich fluid flowstreams to produce exhaust gases, and a nozzle for expelling the exhaust gases from the propulsion system to produce thrust, the nozzle having a throat and an exit opening, the method comprising the steps of:

operating all of said fuel and oxidant turbopumps at preselected flowrates during a booster phase of a flight, the preselected flowrates being selected such that the combined fuel rich flowstreams and oxidant rich flowstreams create an oxidant rich mixture within the combustion means during the booster phase of flight;

selectively shutting down a primary group of the oxidant turbopumps during a sustainer phase of the flight, while operating the remaining oxidant turbopumps and the fuel turbopumps substantially at the same preselected flowrates as used during the booster phase of the flight, the preselected flowrates of the remaining operational turbopumps being selected such that the combustion means is supplied with a fuel rich mixture during the sustainer phase of the flight.

22. A method of operating a rocket propulsion system as recited in claim 21 further comprising the step of extending a pintle into the throat area of the nozzle to reduce the nozzle's effective throat area simultaneously with shutting down the primary group of oxidant turbopumps.

23. A method of operating a rocket propulsion system as recited in claim 21 further comprising the step of simultaneously shutting down a secondary group of at least one additional oxidant turbopump and a group of at least one of said fuel turbopumps to reduce total thrust, while maintaining a substantially constant fuel/oxidizer mixture ratio within the combustion means.

24. A method of operating a rocket propulsion system as recited in claim 23 further comprising the steps of:

extending a pintle a first predetermined distance into the throat area of the nozzle to reduce the nozzle's effective throat area simultaneously with shutting down the primary group of oxidant turbopumps; and extending the pintle a second predetermined distance into the throat area of the nozzle to further reduce the nozzle's effective throat area simultaneously with shutting down the secondary group of oxidant turbopumps and the group of fuel turbopumps.

25. A method of operating a rocket propulsion system as recited in claim 24 further comprising the steps of:

preburning a substantial portion of the fuel with a small portion of the oxidant in each of the fuel turbopumps and utilizing the heat of combustion to gasify substantially all of the unburned fuel within the fuel turbopump to form the fuel rich flowstream; and preburning a substantial portion of the oxidant with a small portion of the fuel in each of the oxidant turbopumps and utilizing the heat of combustion to gasify substantially all of the unburned oxidant within the oxidant turbopump to form the oxidant rich flowstream.

* * * * *

UNITED STATES PATENT AND TRADEMARK OFFICE
CERTIFICATE OF CORRECTION

PATENT NO. : 4,901,525

DATED : February 20, 1990

INVENTOR(S) : JOHN H. BEVERIDGE; WILLIAM H. KNUTH

It is certified that error appears in the above-identified patent and that said Letters Patent is hereby corrected as shown below:

Column 4, lines 36 and 39, delete "turobpumps" and insert --turbopumps--.

Signed and Sealed this

Seventeenth Day of March, 1992

Attest:

HARRY F. MANBECK, JR.

*Attesting Officer*     *Commissioner of Patents and Trademarks*